Figures 1, 2:
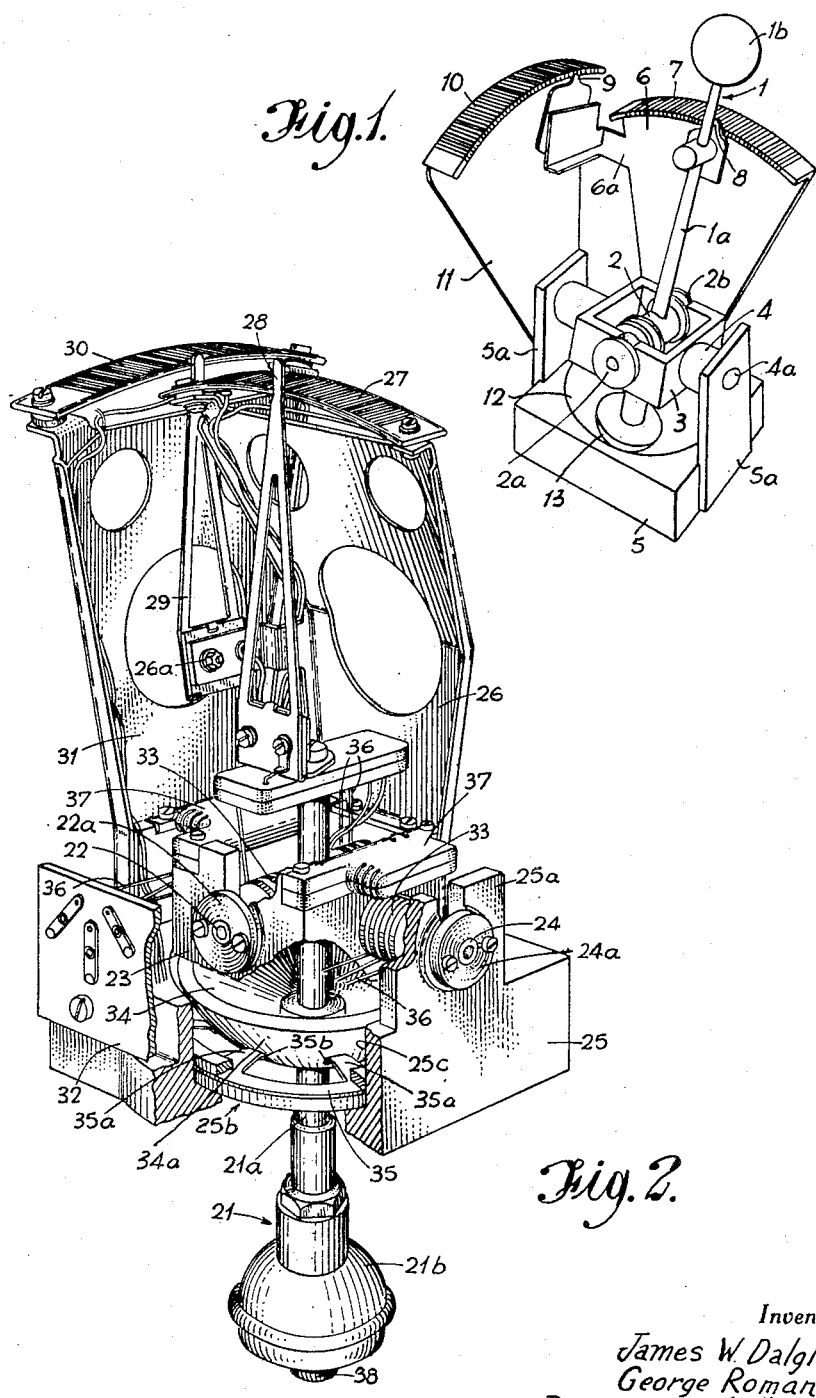

July 8, 1958 J. W. DALGLEISH ET AL 2,842,645
ELECTRICAL CONTROL DEVICE
Filed Dec. 6, 1954

Inventor
James W. Dalgleish
George Roman
By
Attorney

United States Patent Office 2,842,645
Patented July 8, 1958

2,842,645

ELECTRICAL CONTROL DEVICE

James White Dalgleish and George Roman, Cambridge, England, assignors to Pye Limited, Cambridge, England, a British company Application December 6, 1954, Serial No. 473,392

Claims priority, application Great Britain December 8, 1953

7 Claims. (Cl. 201—48)

The invention relates to an electrical control device of the kind in which the movement of a control member over an area in space produces two electrical quantities which are proportional to the position of the control member at any instant relative to Cartesian co-ordinates. Such a control device may, for example, comprise a control member mounted for swinging movement in a universal joint, similar to a joystick, the movement of the control member actuating two potentiometers, resistances or other devices in response to the movement of the control member about two axes at right angles to one another which represent the Cartesian co-ordinates.

Such devices possess the inherent property, resulting from the friction in the bearings and in the potentiometers or the like, that the control member tends to move with a certain amount of bias along one or other of the two main axes; that is to say, if an attempt be made to move the control member at an angle to the two axes, there is a tendency for the motion to start in the direction of one or other of the axes.

The present invention has for its object to overcome this difficulty so that the control member can be moved steadily and smoothly in any desired direction, and to this end, the invention consists in associating with the control member an isotropic friction device which, when the control member is moved, exerts a substantially uniform frictional resistance irrespective of the direction of movement, the amount of friction created in the isotropic friction device being large compared with the friction produced by the bearings and potentiometers or the like in preferred axes whereby the latter friction is reduced to an arbitrarily small fraction of the total friction.

The control member may be arranged to control the movement of the wipers of two potentiometers connected across the outputs of one or more voltage sources so that changes in angular displacement of the control member produces changes in the output voltages derived from the wipers of the two potentiometers.

The isotropic friction device preferably comprises a friction element which engages a friction surface, said friction element and said friction surface being relatively movable upon movement of the control member and said friction surface having a contour such as to produce a substantially constant resistance to motion of the control member regardless of the direction in which it is moved.

In order that the invention may be more fully understood, reference will now be made to the accompanying drawings, in which:

Figure 1 is a diagrammatic perspective view of one form of control device according to the invention, and Figure 2 is a perspective view partly broken away of another construction according to the invention.

Referring to Figure 1, the device comprises a control member generally indicated at 1, and consisting of a rod 1a carried by a shaft 2 which is pivotally mounted in bearings 2a in an inner frame 3, which itself is carried on a shaft 4, arranged at right angles to the shaft 2, and pivotally mounted in bearings 4a carried by lugs 5a provided on a supporting frame or base 5. The control member 1 is thus mounted in a gimbal arrangement forming a universal bearing and is capable of swinging movement like a joystick. A knob 1b is provided at one end of the rod 1a for manually moving the control member 1. The inner frame 3 carries a support 6, at the upper end of which is mounted a resistance-strip 7 over which can slide a wiper 8, attached to but electrically insulated from the control member 1, as the latter rocks about the axis of shaft 2. The support 6 also carries a wiper 9 attached to but insulated from a bracket 6a, and arranged to slide over a resistance-strip 10 carried by a support 11 fixed to the frame 5 as the control member 1 is rocked about the axis of shaft 4. Thus as the control member 1 is moved in space, the wipers 8 and/or 9 will move over the resistance strips 7 and/or 10, respectively. The resistance strips 7 and 10 and associated wipers 8 and 9 constitute potentiometers to be connected across a voltage source enabling voltages to be produced respectively at the wipers 8 and 9 which are proportional to the position of the control member at any instant relative to Cartesian co-ordinates. The electrical connections to the wipers through which the output voltages are derived may conveniently be completed through sliprings (not shown) movable with the shafts 2 and 3 with which engage brushes (also not shown) carried from the frame 3 and base 5.

The friction between the wipers and their associated resistance strips tends to cause the control member to move, when pushed or pulled, along either of the two main axes and in order to reduce this tendency, according to the invention, an isotropic friction device is provided, which in the illustrated embodiment comprises a part-spherical friction surface 12 formed as a cavity in the base 5, over which slides a spring-loaded friction element 13, attached to the lower end of the control member 1 and preferably having its undersurface shaped to conform to the surface 12. The centre of curvature of the cavity is arranged to be at the common centre of rotation for the axes of the two shafts 2 and 4.

The isotropic friction device produces a frictional force opposing movement of the control member 1, which is substantially greater than the other frictional forces opposing its movement and only allows motion to start after the applied force is sufficiently great to overcome the opposition of the isotropic friction device.

In the embodiment of Figure 2 the control device comprises a supporting frame 25 which forms the outer frame of a gimbal arrangement and is provided with lugs 25a in which are mounted bearings 24a carrying the shaft 24 pivotally supporting the inner frame 23. A control member generally indicated at 21, comprises a rod 21a which extends through an aperture 25b in the frame 25 and is carried by a shaft 22 arranged at right angles to the shaft 24 and pivotally mounted within the inner frame 23 by means of bearings 22a. The end of the rod 21a projecting through the aperture 25b in the frame 25 is provided with a control knob 21b which can be gripped in the hand for manually moving the control member 21.

In a similar manner to the embodiment illustrated in Figure 1, the inner frame 23 carries a support 26 at the upper end of which is mounted a resistance strip 27 over which can slide a wiper 28 attached to, but electrically insulated from the rod 21a, as the control member 21 rocks about the axis of shaft 22. The support 26 also carries a wiper 29 attached to but insulated from a bracket 26a and arranged to slide over a resistance strip 30 carried by a support 31 fixed to the frame 25, as the control member is rocked about the axis of shaft 24.

Thus, as the control member 21 is moved in space the wipers 28 and/or 29 will move over the resistance strip 27 and/or 30 respectively.

In this embodiment the connecting wires 36 to the wipers 28 and 29 and to the resistance strips 27 and 30 are led from a terminal strip 32 carried from the frame 25 to their respective connecting points over one or more insulating bushes 33 mounted on and fixed relative to the shafts 22 and 24 of the gimbal arrangement constituting the universal joint and via intermediate connecting panels 37 fixed to the frame 23. The voltage source or sources supplying the resistance strips 27 and 30, so that voltages can be derived from the wipers 28 and 29 proportional to the position of the control member at any instant, are connected to the terminal strip 32. The bushes 33 are provided with a plurality of annular grooves 33a, and one connecting wire is located in each annular groove whereby the wires are maintained spaced from each other and restrained against lateral movement. With this arrangement the insulating bushes turn with the shafts 22 and 24 as the control member 21 is moved and can move relative to the wires so that little movement of the wires occurs as the control member is moved in any direction, which minimises the risk of fracture of the connecting wires due to constant movement with movement of the control member.

The isotropic friction device according to the invention comprises a circular member 34 fixed to the rod 21a of the control member and provided with a part-spherical surface 34a which is engaged by a friction element comprising a plurality of fingers 35a arranged around the periphery of a circular cavity 25c surrounding the aperture 25b in the base 25. The centre of curvature of the spherical surface 34a is arranged to be at the common centre of rotation for the axes of the two shafts 22 and 24. The fingers 35a are preferably made of a springy metal and form a series of inwardly directed projections integral with a ring 35 surrounding the periphery of the cavity 25c and firmly fixed to the base member 25. The tip 35b of each finger is shaped to form a friction pad engaging the part-spherical surface 34a with a predetermined friction and produce a frictional force opposing movement of the control member which is substantially greater than the other frictional forces opposing its movement and only allows motion to start after the applied force is sufficiently great to overcome the opposition of the isotropic friction device.

A push-button 38 is provided in the knob 21b and controls a switch within the knob which can be connected in a circuit associated with the control device for signalling or other purposes.

The isotropic friction devices according to the invention thus reduce to negligible proportions the inherent frictional bias to the movement of the control member in certain directions and produces a substantially constant "feel" to the movement of the control member.

Whilst particular embodiments have been described, it will be understood that various modifications may be made without departing from the scope of the invention. Thus, whilst in the embodiments described the resistance strips of the potentiometer are carried directly from the gimbal frames, if desired the control member may be connected to operate levers or the like actuating the wipers of potentiometers situated remote from the control device.

Alternatively, the potentiometers or other electrical control elements may be driven directly from the shafts of the gimbal arrangement supporting the control member so as to rotate with the shafts upon movement of the control member.

We claim:

1. An electrical control device of the kind in which the movement of a control member over an area in space produces two electrical quantities which are proportional to the position of the control member at any instant comprising a control member, a first control element producing one electrical quantity actuated by movement of the control member about a first axis, a second control element producing the second electrical quantity actuated by movement of the control member about a second axis, a universal joint supporting said control member, and an istotropic friction device associated with said control member said isotropic friction device comprising a friction element and a co-operating friction surface, said friction element and said friction surface being relatively movable upon movement of the control member and said friction surface having a contour such as to produce a substantially constant resistance to motion of the control member regardless of the direction in which it is moved, the amount of friction created in said isotropic friction device being large compared with the friction produced by the other moving parts of the control device.

2. A control device as claimed in claim 1, in which the friction element is spring-loaded.

3. An electrical control device of the kind in which the movement of a control member over an area in space produces two electrical quantities which are proportional to the position of the control member at any instant, comprising a control member, a first control element producing one electrical quantity actuated by movement of the control member about a first axis, a second control element producing the second electrical quantity actuated by operation of the control member about a second axis, a universal joint supporting said control member and an isotropic friction device associated with said control member, said isotropic friction device comprising a spring-loaded friction element fixed to said control member, and a relatively movable part-spherical friction surface adapted to be engaged by said friction element, the amount of friction created in said isotropic friction device being large compared with the friction produced by the other moving parts of the control device.

4. An electrical control device of the kind in which the movement of a control member over an area in space produces two electrical quantities which are proportional to the position of the control member at any instant comprising a control member, a first control element producing one electrical quantity actuated by movement of the control member about a first axis, a second control element producing the second electrical quantity actuated by operation of the control member about a second axis a universal joint, supporting said control member and an isotropic friction device associated with said control member, said isotropic friction device comprising a part-spherical friction surface fixed to said control member, and movable relative to a plurality of friction members engaging said part-spherical friction surface, the amount of friction created in said isotropic friction device being large compared with the friction produced by the other moving parts of the control device.

5. A control device as claimed in claim 4, in which the friction members are spring-loaded.

6. An electrical control device of the kind in which the movement of a control member over an area in space produces two electrical quantities which are proportional to the position of hte control member at any instant comprising a control member, a first control element producing one electrical quantity actuated by movement of the control member about a first axis, a second control element producing the second electrical quantity actuated by operation of the control member about a second axis, a universal joint, supporting said control member and an isotropic friction device associated with said control member said isotropic friction device comprising a part-spherical friction surface fixed to said control member, and movable relative to a plurality of inwardly directed fingers of a springy material formed integrally with a ring and engaging said part-spherical surface, the amount of friction created in said isotropic friction device being large compared with the friction produced by the other moving parts of the control device.

7. An electrical control device of the kind in which the movement of a control member over an area in space produces two electrical quantities which are proportional to the position of the control member at any instant comprising a control member, a gimbal arrangement having an outer frame and an inner frame supporting said control member, a first potentiometer having a resistance track carried by a first support fixed relative to the inner frame of the gimbal arrangement and a wiper carried by the control member producing one electrical quantity actuated by movement of the control member about a first axis, a second potentiometer having a resistance track carried by a second support fixed relative to the outer frame of the gimbal arrangement and a wiper carried by the first support producing the second electrical quantity actuated by movement of the control member about a second axis, bearing shafts for said gimbal arrangement including insulated bushes provided with annular grooves in which are located wires connecting said potentiometers to a terminal panel and an isotropic friction device associated with said control member which, when the control member is moved, exerts a substantially uniform frictional resistance irrespective of the direction of movement, the amount of friction created in said isotropic friction device being large compared with the friction produced by the other moving parts of the control device.

References Cited in the file of this patent

UNITED STATES PATENTS

| | | |
|---|---|---|
| 2,198,523 | Adams | Apr. 23, 1940 |
| 2,470,968 | Aske | May 24, 1949 |
| 2,471,821 | Kutzler et al. | May 31, 1949 |